US008622295B2

(12) United States Patent
Peterek

(10) Patent No.: US 8,622,295 B2

(45) Date of Patent: Jan. 7, 2014

(54) UNIT OF A MEDIA DEPOSITORY

(75) Inventor: Thomas Peterek, Kitchener (CA)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/250,639

(22) Filed: Sep. 30, 2011

(65) Prior Publication Data

US 2013/0081561 A1 Apr. 4, 2013

(51) Int. Cl.
*G06K 5/00* (2006.01)

(52) U.S. Cl.
USPC ............ 235/437; 235/379; 235/380; 235/444

(58) Field of Classification Search
USPC .................................. 235/379, 380, 437, 444
See application file for complete search history.

(56) References Cited

U.S. PATENT DOCUMENTS

2004/0205024 A1* 10/2004 Washington et al. ........... 705/43

* cited by examiner

*Primary Examiner* — Michael G Lee
*Assistant Examiner* — Tabitha Chedekel
(74) *Attorney, Agent, or Firm* — Michael Chan

(57) ABSTRACT

A unit of a media depository is described. The unit comprises: a body adapted to be supported by at least one support member of the depository in a working position and further adapted to be slidably moveable on the at least one supporting member between the working position and a pivot position; a first hinge member adapted to be movably mounted on the at least one support member; and, a second hinge member attached to or integral with the body. When the body is moved from the working position to the pivot position, the first and second hinge members engage such that the first hinge member is forced by the second hinge member to move with the body to the pivot position at which the first and second hinge members form a pivoting mechanism by which the body is pivotally attached to the at least one support member.

19 Claims, 4 Drawing Sheets

UNIT OF A MEDIA DEPOSITORY

FIELD OF INVENTION

The present invention relates to improvements in, or relating to, a unit of a media depository.

BACKGROUND OF INVENTION

Media depositories are used to receive media items from a customer. One common type of media depository is a sheet media depository for receiving media items in sheet form (such as banknotes, cheques, tickets, giros, and the like).

Sheet media depositories are used in ATMs and other self-service terminals (such as vending machines, change machines, and the like) to identify and validate deposited sheets.

Sheet media depositories may comprise a number of units each performing a different task. For instance, a sheet media depository may comprise a rebuncher unit which forms part of a media depository. Mixed notes are fed by a customer into the depository which presents each note individually to a validator unit. Invalid notes are stored or returned to the customer. Valid notes are typically reformed into a bunch. The rebuncher unit is used to reform the bunch which is either returned to the customer or sent to storage hoppers. Sometimes media fed into or out of the rebuncher unit becomes jammed.

The term “depository” should be understood to include a module of an ATM sometimes referred to as a “recycler” whose manner of operation is somewhat similar to a depository albeit that a recycler may be used to dispense deposited notes to a subsequent customer.

Units and other hardware are often grouped within a depository very closely together, not only so that they can easily interact with one another, but also because space is often at a premium. This can make it difficult for an operator wishing to work on a unit, for example, to service or to release jammed media, to access its internal workings.

Some units in a depository may be racked out to facilitate servicing. To rack out a unit, a release handle or door is typically provided. Sometimes a unit’s release door can only be reached by removing other, adjacent units or hardware. For instance, a rebuncher unit part of a depository in an ATM may be located adjacent bins, and the release door, which may be underneath the unit, may be accessed only by removing the bins, which is inconvenient and requires considerable effort.

SUMMARY OF INVENTION

According to a first aspect, there is provided a unit of a media depository, the unit comprising:

a body adapted to be supported by at least one support member of the depository in a working position and further adapted to be slidably moveable on the at least one supporting member between the working position and a pivot position;

a first hinge member adapted to be movably mounted on the at least one support member; and a second hinge member attached to or integral with the body;

wherein, as the body is moved from the working position to the pivot position, the first and second hinge members engage such that the first hinge member is forced by the second hinge member to move with the body to the pivot position at which the first and second hinge members form a pivoting mechanism by which the body is pivotally attached to the at least one support member.

A pivotal attachment enables the unit to be pivoted away from the pivot position to a service position at which the unit can be worked on more conveniently. For example, if the unit has a release door that is inaccessible when the unit is in the normal, working position, the unit can be moved out of the working position, to the pivot position and pivoted to the service position at which the door is accessible.

In the working position of the body, the at least one support member extends through the body and, in the pivot position, the body is substantially removed from the at least one support member.

The at least one support member may be attached or fastened to or integral with at least one structural member of the depository. The structural member may be a wall, a beam, a strut or any other type of member that forms part of the structure of the depository. Alternatively, the wall, beam or strut may form part of the structure of the machine of which the depository forms part or of another unit that forms part of the same machine.

The at least one support member may be, for example, a rod or a rail. Preferably, there are two supporting members.

Preferably, the second hinge member comprises at least one hook-like finger and engagement between the first hinge member and the at least one hook-like finger involves the first hinge member being hooked by the at least one hook-like finger. The first hinge member may comprise a pin, a bar, an eye or any other part that is capable of being hooked by the at least one hook-like finger. Further preferably, the second hinge member comprises two hook-like fingers.

Preferably, the first hinge member remains stationary on the at least one support member during a first phase of movement of the body from the working position to the pivot position and moves relative to the at least one support member during a second phase of movement of the body from the working position to the pivot position, and wherein the second phase of movement ends with the first hinge member being releasably locked to the at least one support member at the pivot position. The first hinge member may comprise a bushing, sleeve or collar which is mounted on the at least one support member by being slid on to the at least one support member, and the at least one support member may slide through the first hinge member during the second phase of movement of the body to the pivot position. Further preferably, the first hinge member comprises an engaging part and the at least one support member comprises a feature, and wherein engagement between the engaging part and the feature results in the first hinge member being releasably locked to the at least one support member at the pivot position. Equally, the at least one support member could comprise an engaging part and the first hinge member could comprise a feature. Preferably, the feature comprises a groove and the engaging part comprises at least one resilient finger, and engagement between the engaging part and the feature comprises the at least one finger extending into the groove. Preferably, the groove is also used by a latching mechanism to latch the at least one support member in the support position.

Preferably, there is at least one cavity in the body through which the at least one support member extends when the body is in the working position, and, when the body is in the working position, the first hinge member is housed in the at least one cavity.

Further preferably, the first hinge member remains locked to the at least one support member during a first phase of movement of the body back from the pivot position to the working position. A release arrangement is provided for unlocking the first hinge member from the at least one support member after the first phase of movement of the body back to the working position so that, during the latter part of the movement, the first hinge member moves relative to the at least one support member. In the case where the body has at least one cavity, the release arrangement is provided by the cavity, in particular, an end wall of the cavity.

The unit may be a rebuncher unit part of a depository module of an ATM. The rebuncher unit may comprise an escrow rebuncher unit.

According to a second aspect, there is provided a unit of a media depository, the unit comprising:

a body adapted to be supported by at least one support member of the depository in a working position and further adapted to be slidably moveable on the at least one support member between the working position and a pivot position;

wherein in the working position the at least one support member extends through the body and in the pivot position the body is substantially removed from the at least one support member; and a pivot mechanism by which the body is pivotally attached to the at least one support member at least when the body is at the pivot position.

According to a third aspect, there is provided a unit of a media depository, the unit comprising a support arrangement adapted to adopt either one of two states: a working state in which the unit is supported by at least one support member of the depository; and, a pivot state in which the unit is pivotally attached to the at least one support member.

According to a fourth aspect, there is provided a method of working on a unit of a media depository, the method comprising changing the state of the unit from a support state in which the unit is supported by at least one support member of the depository to a pivot state in which the unit is pivotally attached to the at least one support member.

BRIEF DESCRIPTION OF THE DRAWINGS

These and other aspects will now be described, by way of example, with reference to the following drawings, in which.

DETAILED DESCRIPTION

Figure 1:
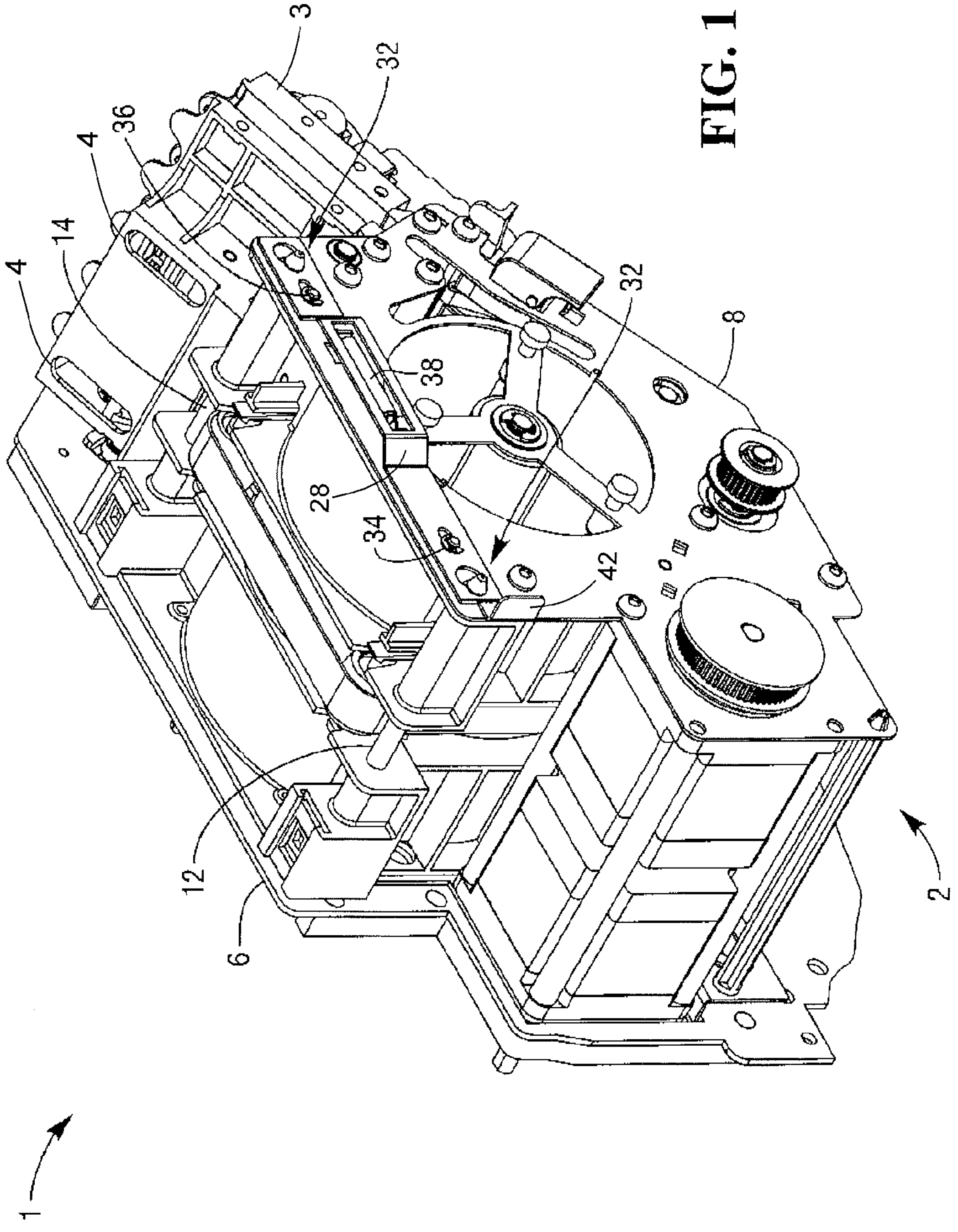
FIG. 1 is a perspective view of part of a sheet media depository used in an ATM, including a unit (in the form of an escrow rebuncher) according to one embodiment of the invention, with the rebuncher shown in a support position.
Figure 1A:
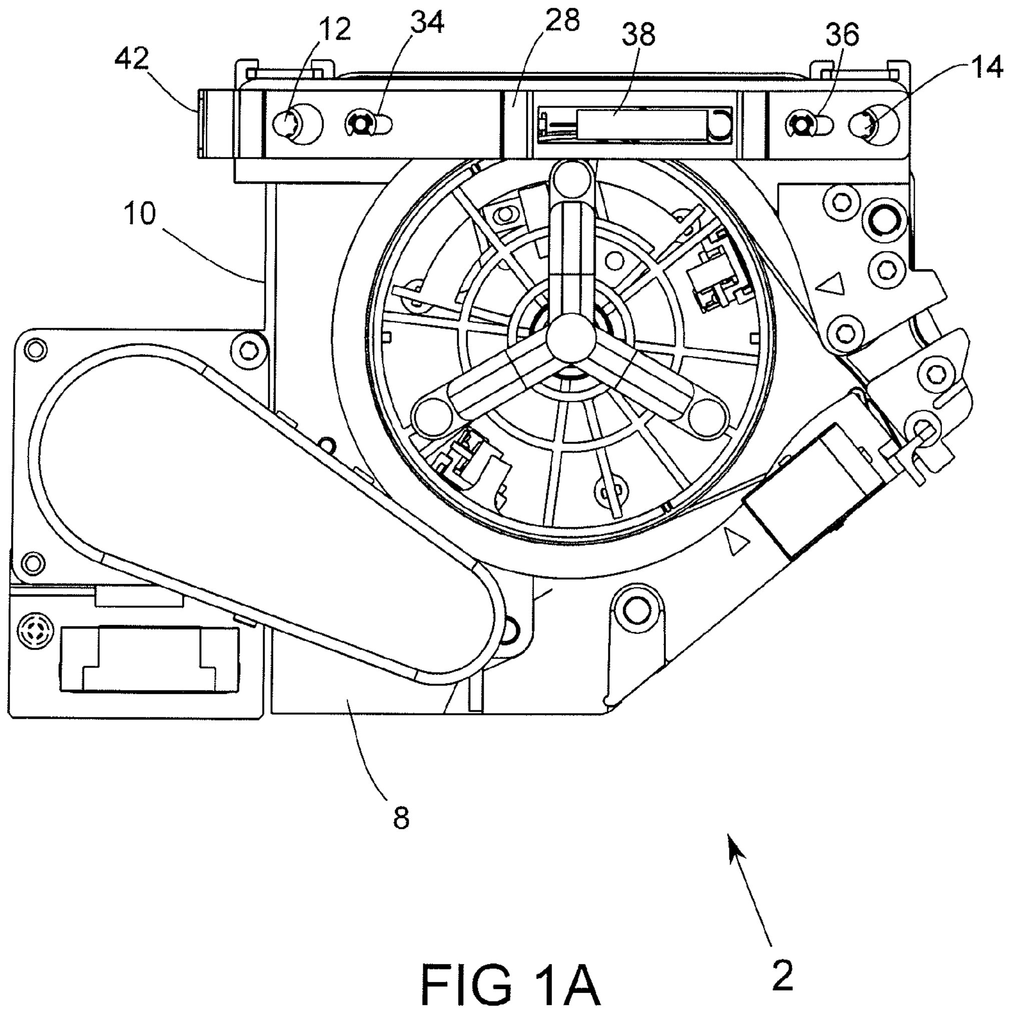
FIG. 1A is a side view of the rebuncher unit of FIG. 1.

With reference to FIGS. 1 and 1A, indicated generally at 1 is part of a media depository. Visible within FIG. 1 (but most clearly seen in FIG. 1A) is a rebuncher unit 2 which is part of the media depository 1. The part of the media depository illustrated in FIG. 1 includes a transport arrangement 3 including elongated slots 4 on an upper portion thereof.

A customer (not shown) feeds notes (not shown) into the depository 1 in bunches. The individual notes are presented to a note validator unit (not shown). Following validation, the rebuncher unit 2 reforms the notes into a bunch.

Figure 2:
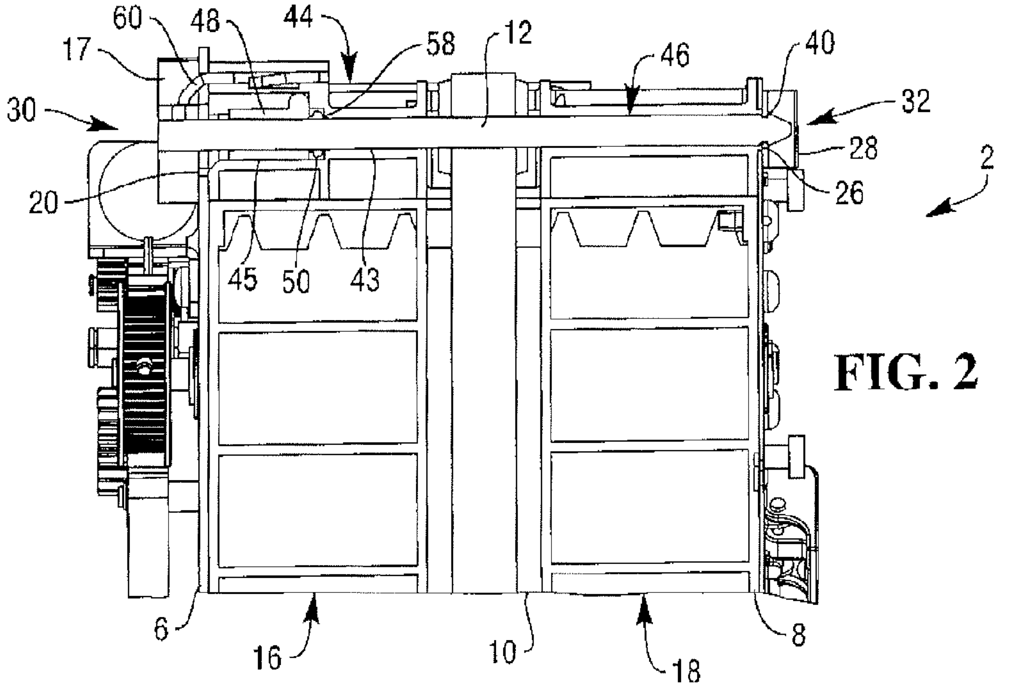
FIG. 2 is a partial, transverse cross sectional view (taken through the elongate axis of the support member) of the rebuncher shown in FIG. 1.

With reference also to FIG. 2, the rebuncher unit 2 has a body 10 of a moulded plastics material construction separated broadly into first and second body halves 16, 18. In the normal, working position of the rebuncher unit 2 as shown in FIGS. 1 and 2, the body 10 is supported on a pair of support members in the form of rods 12, 14 attached to and extending from a wall 6. The rods 12, 14 and wall 6 are part of the depository. Access to the internal workings of the rebuncher unit 2 is gained by a release door (not visible in FIG. 1) which is underneath the body 10. From time to time, the rebuncher unit 2 becomes jammed with notes and access is required in order to free the jam.

Each rod 12, 14: has a proximal end 30 adjacent the wall 6 and a distal end 32 adjacent an open side 8 of the body 10; is attached to the wall 6 by a head 17 at its proximal end 30 on the remote side of the wall 6 to the body 10; and, extends through the wall 6 and the body 10, that is, through an opening 20 in the wall 6, through the material of the first body half 16, through the material of the second body half 18 and through an opening 26 in the side 8. The body 10 is held in the working position by a unitary latch mechanism 28 which latches the distal ends 32 of the rods 12, 14.

The latch mechanism 28 is provided with two teardrop-shaped apertures 34, 36 whose spacing matches that of the openings 26 in the side 8. The latch mechanism 28 is urged by a spring 38 into its default position in which each of the narrow sections of the apertures 34, 36 is aligned with a corresponding opening 26 in the side 8. Each rod 12, 14 has a circumferential groove 40 adjacent its distal end 32 and the narrower part of the apertures 34, 36 are so sized that the web of the latch around the apertures 34, 36 extends into the circumferential groove 40 and latches the rods 12, 14 in place.

The latch mechanism 28 has a handle 42, and the body 10 is released from the rods 12, 14 by moving the latch mechanism 28 to the disengaged position, against the urging force of the spring 38, so that the web of the latch mechanism 28 is pulled out of the groove 40 and aligns the wider part of the apertures 34, 36 with the opening 26 in the second wall, whereupon, because the wider section of the aperture 34, 36 is bigger than the opening 26, the body 10 is free to slidably move relative to the rods 12, 14.

For simplicity's sake, the embodiment will be further described with reference to one of the rods 12 only, although it will be appreciated that other embodiments comprises two such rods 12, 14 and two sets of associated components, even though only one set of associated components are described in relation to the one rod 12.

Each body half 16, 18 contains a cavity 44, 46 through which the rod 12 extends. In the working position of the body 10, the first cavity 44 in the first body half 16 is adjacent the wall 6 and the second cavity 46 in the second body half 18 is adjacent the side 8. The first cavity 44 is divided broadly into two parts: a first part 43, remote from the wall 6, is of the same diameter as the rod 12; and, a second part 45, adjacent the wall 6, has an enlarged diameter.

A first hinge member in the form of a bushing 48 is slid on to the rod 12. Again, in the working position of the body 10, the bushing 48 sits around the rod 12 in the enlarged diameter part 45 of the first cavity 44.

Figure 5:
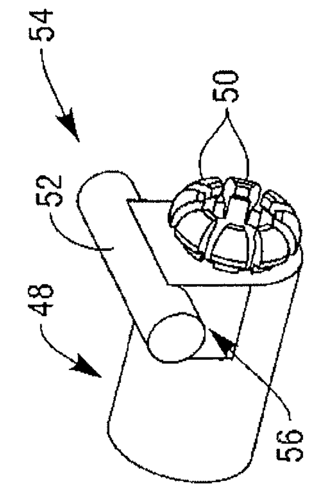

With further reference to FIG. 5, the bushing 48 is generally cylindrical except that at one end it has inwardly directed resilient fingers 50 and, at the same end, a pin 52, which is slightly longer than the diameter of the bushing 48, is transversely mounted (in relation to the cylindrical axis of the bushing 48) on the outer cylindrical surface of the bushing 48. The pin 52 is mounted generally at its midpoint so that its ends 54, 56 are free, each one projecting in an opposite direction to the other. The enlarged diameter part 45 of the first cavity 44 is sized and shaped so as to house the bushing 48 in the support position with the pin 52 uppermost. The second cavity 46, which is cylindrical, is the same diameter as the rod 12. When the bushing 48 is housed in the enlarged diameter part of the first cavity 44, the resilient fingers 50 butt up against the in-board end wall 58 of the enlarged diameter portion 45 of the first cavity 44.

Attached to the outside of the first body half 16, adjacent the opening 20 in wall 6 is a second hinge member in the form of two, spaced-apart, j-shaped, hook-like fingers 60 which project such that each one is to an opposite side of the elongate axis of the rod 12.

Figure 3:
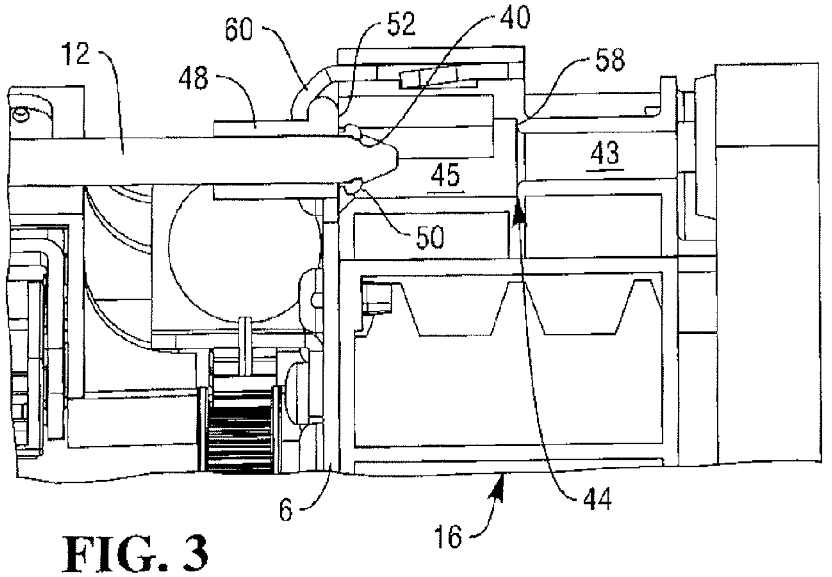
FIG. 3 is a partial, transverse cross sectional view (taken through the elongate axis of the support member) of the rebuncher of FIGS. 1 and 2, shown in a pivot position.

It will now be explained how the dispenser unit 2 is taken out of the depository by removing the body 12 from the rod 12: with the latch mechanism 28 moved to the disengaged position (not shown), the body 10 is free to move transversely of the rod 12, that is, to the right as shown in FIG. 3.

During the first phase of movement of the body 10, the bushing 48 remains stationary on the rod 12, held by the frictional contact between the bushing 48 and the rod 12. Continued removal of the body 10 results in the hook-like fingers 60 engaging the bushing 48, which involves each one of the hook-like fingers 60 hooking around one of the free ends 54, 56 of the pin 52. The radius of curvature of the hook-like fingers 60 may be such that the hook-like fingers 60 clip on to the ends 54, 56 of the pin. This engagement marks the beginning of the second phase of movement of the body 10. Once the bushing 48 is hooked by the fingers, continued movement of the body 10 forces the bushing 48 to move with the body 10, relative to the rod 12. In effect, the bushing 48 is pulled along by the hook-like fingers 60.

Figure 4:
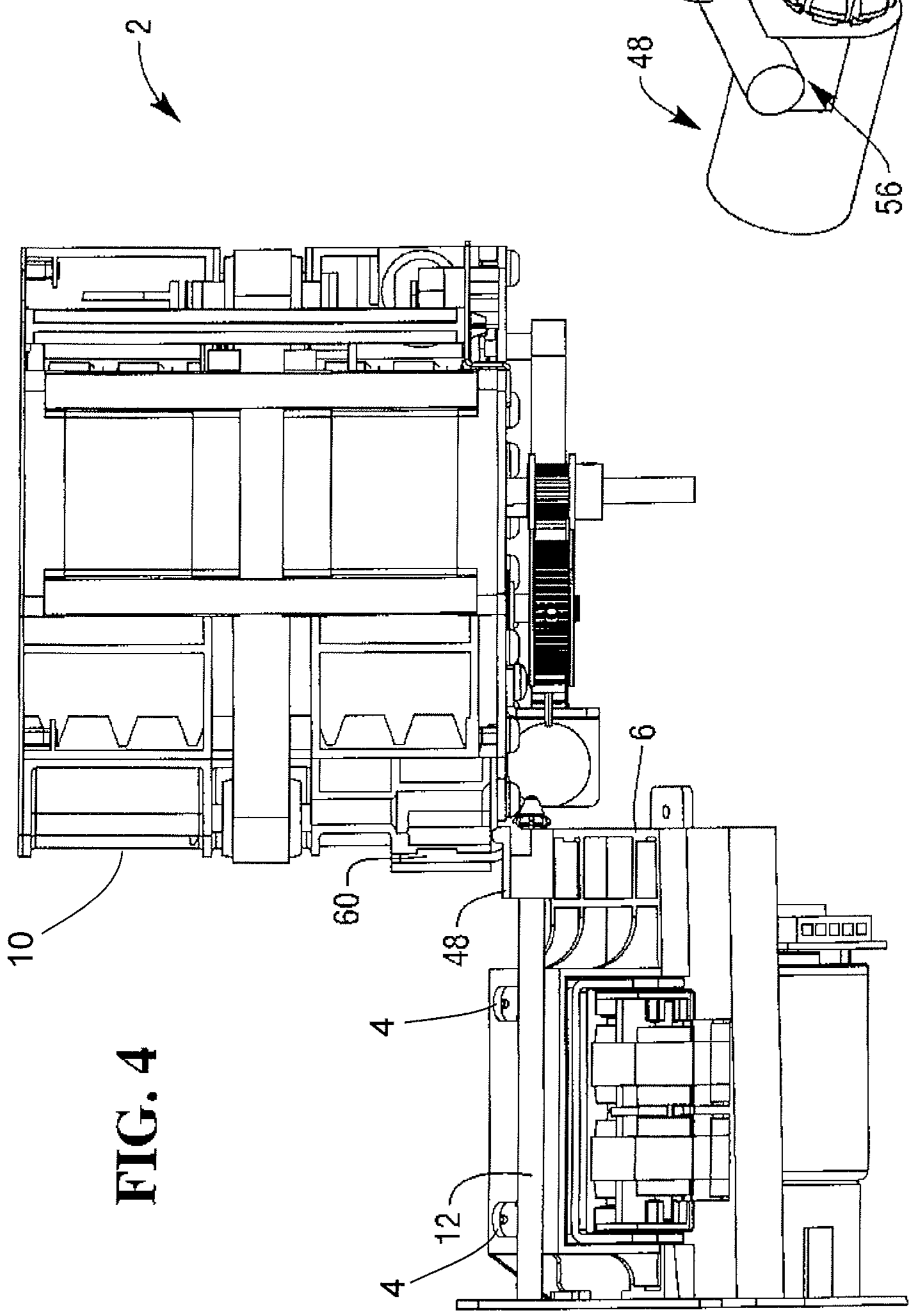
FIG. 4 is a partial end view of the rebuncher of FIGS. 1 to 3, shown pivotally attached to a structural member of the media depository, in a pivoted position; and, FIG. 5 is a perspective view of a first hinge member of the rebuncher of FIGS. 1 to 4.

The second phase of movement continues with the body 10 continuing to be moved until it is substantially removed from the rod 12, at which point the resilient fingers 50 of the bushing 48 engage the groove 40 in the rod 12 by extending into it, causing the bushing 48 to lock onto the rod 12. This is the end of the second phase of movement. The body 10 is then in the pivot position and, because the body 10 is substantially removed from the rod 12 and the rod 12 no longer extends through the body 10, the fingers 60 and the pin 52 form a pivoting mechanism by which the unit 2 is pivotally attached to the rod 12. In this position, the unit 2 is able to pivot upwardly about the rod 12 as shown in FIG. 4. The body 10 can be pivoted such that the transverse axis of the body 10 is substantially orthogonal to how it is in the pivot position. With the body 10 in the pivoted-upwards position, known as the service position, it is possible to access the door underneath the rebuncher unit, for example, to free any jams.

When the body 10 is returned (pivoted downwards in this embodiment) to the pivot position, the body 10 can be re-inserted into the media dispenser 1 by sliding it over the rod 12.

During the first phase of movement of the body 10 back from the pivot position to the working position, the bushing 48 initially remains locked to the rod 12 until the body 10 reaches a position where the bushing is re-housed within the enlarged diameter portion 45 of the first cavity 44, whereupon the in-board end wall 58 of the first cavity 44 butts up against the resilient fingers 50 of the bushing 48. This marks the beginning of the second phase of movement of the body 10 back to the working position and, from then on, further movement of the body 10 causes the bushing 48 to unlock from the rod 12, allowing the bushing 48 and body 10 to slide together over the rod 12 until the body 10 reaches the working position where it is again latched by the latch mechanism 28.

What is claimed is:

1. A unit of a media depository, the unit comprising:
- a body adapted to be supported by at least one support member of the depository in a working position and further adapted to be slidably moveable on the at least one supporting member between the working position and a pivot position;
- a first hinge member adapted to be movably mounted on the at least one support member; and
- a second hinge member attached to or integral with the body;
- wherein, as the body is moved from the working position to the pivot position, the first and second hinge members engage such that the first hinge member is forced by the second hinge member to move with the body to the pivot position at which the first and second hinge members form a pivoting mechanism by which the body is pivotally attached to the at least one support member;
- wherein the second hinge member comprises at least one hook-like finger and engagement between the first hinge member and the at least one hook-like finger involves the first hinge member being hooked by the at least one hook-like finger.

2. A unit according to claim 1, wherein, in the working position, the at least one support member extends through the body and, in the pivot position, the body is substantially removed from the at least one support member.

3. A unit according to claim 1, wherein there is at least one cavity in the body through which the at least one support member extends when the body is in the working position, and, when the body is in the working position, the first hinge member is housed in the at least one cavity.

4. A unit according to claim 1, wherein the first hinge member remains locked to the at least one support member during a first phase of movement of the body back from the pivot position to the working position.

5. A unit according to claim 4, wherein a release arrangement is provided for unlocking the first hinge member from the at least one support member after the first phase of movement of the body from the pivot position to the working position such that, during a second phase of movement of the at least one supporting member from the pivot position to the working position, the first hinge member moves with the body relative to the at least one supporting member.

6. A unit according to claim 1, where the unit comprises a rebuncher unit part of a media depository.

7. A unit of a media depository, the unit comprising:
- a body adapted to be supported by at least one support member of the depository in a working position and further adapted to be slidably moveable on the at least one supporting member between the working position and a pivot position;
- a first hinge member adapted to be movably mounted on the at least one support member; and
- a second hinge member attached to or integral with the body;
- wherein, as the body is moved from the working position to the pivot position, the first and second hinge members engage such that the first hinge member is forced by the second hinge member to move with the body to the pivot position at which the first and second hinge members form a pivoting mechanism by which the body is pivotally attached to the at least one support member;
- wherein the first hinge member remains stationary on the at least one support member during a first phase of movement of the body from the working position to the pivot position and moves relative to the at least one support member during a second phase of movement of the body from the working position to the pivot position, and wherein the second phase of movement ends with the first hinge member being releasably locked to the at least one support member at the pivot position.

8. A unit according to claim 7, wherein the first hinge member comprises a bushing, sleeve or collar which is slid on to the at least one support member, and the at least one support member slides through the first hinge member during the second phase of movement of the body to the pivot position.

9. A unit according to claim 7, wherein, in the working position, the at least one support member extends through the body and, in the pivot position, the body is substantially removed from the at least one support member.

10. A unit according to claim 7, wherein there is at least one cavity in the body through which the at least one support member extends when the body is in the working position, and, when the body is in the working position, the first hinge member is housed in the at least one cavity.

11. A unit according to claim 7, where the unit comprises a rebuncher unit part of a media depository.

12. A unit of a media depository, the unit comprising:

a body adapted to be supported by at least one support member of the depository in a working position and further adapted to be slidably moveable on the at least one supporting member between the working position and a pivot position;

a first hinge member adapted to be movably mounted on the at least one support member; and a second hinge member attached to or integral with the body;

wherein, as the body is moved from the working position to the pivot position, the first and second hinge members engage such that the first hinge member is forced by the second hinge member to move with the body to the pivot position at which the first and second hinge members form a pivoting mechanism by which the body is pivotally attached to the at least one support member;

wherein one of the first hinge member and the at least one support member comprises an engaging part and the other of the first hinge member and the at least one support member comprises a feature, and wherein engagement between the engaging part and the feature results in the first hinge member being releasable locked to the at least one support member at the pivot position;

wherein the feature comprises a groove and the engaging part comprises at least one resilient finger, and engagement between the engaging part and the feature comprises the at least finger extending into the groove.

13. A unit according to claim 12, wherein the groove is in the at least one support member and the groove is also used by a latching mechanism to latch the at least one support member in the support position.

14. A unit according to claim 12, wherein, in the working position, the at least one support member extends through the body and, in the pivot position, the body is substantially removed from the at least one support member.

15. A unit according to claim 12, wherein there is at least one cavity in the body through which the at least one support member extends when the body is in the working position, and, when the body is in the working position, the first hinge member is housed in the at least one cavity.

16. A unit according to claim 12, where the unit comprises a rebuncher unit part of a media depository.

17. A media depository comprising:

a rod having elongate axis and an outer cylindrical surface extending lengthwise along the elongate axis;

a body slidably moveable along the outer cylindrical surface of the rod between a working position in which the rod extends through the body and a pivot position in which the rod no longer extends through the body and the body is able to pivot in a direction transverse to lengthwise direction of the elongate axis; and a pivot mechanism arranged to (i) support sliding movement of the body along the outer cylindrical surface of the rod between the working position and the pivot position, and (ii) support pivoting movement of the body in the direction transverse to lengthwise direction of the elongate axis when the body is in the pivot position.

18. A media depository according to claim 17, wherein the pivot mechanism includes (i) a first hinge member slidably moveable along the outer cylindrical surface of the rod between a first position which corresponds to when the body is in the working position and a second position which corresponds to when the body is in the pivot position, and (ii) a second hinge member attached to the body and moveable with the body when the body moves between the working position and the pivot position, wherein the second hinge member engages the first hinge member to forcibly slide the first hinge member along the outer cylindrical surface of the rod from the first position to the second position when the body slidably moves long the outer cylindrical surface of the rod from the working position to the pivot position.

19. A method of a service operator servicing a media depository which includes (i) a rod having elongate axis and an outer cylindrical surface extending lengthwise along the elongate axis, and (ii) a body slidably moveable along the outer cylindrical surface of the rod between a working position in which the rod extends through the body and a pivot position in which the rod no longer extends through the body and the body is able to pivot in an upward direction transverse to lengthwise direction of the elongate axis, the method comprising:

sliding the body along the outer cylindrical surface of the rod from the working position of the body to the pivot position of the body;

pivoting the body in the upward direction transverse to lengthwise direction of the elongate axis of the rod when the body is in the pivot position to allow the service operator to gain access to components underneath the body;

after the service operator has gained access to the components underneath the body, pivoting the body in a downward direction to return the body to the pivot position; and after the body has returned to the pivot position, sliding the body along the outer cylindrical surface of the rod from the pivot position to the working position of the body and thereby to return the body to the working position.

* * * * *